Figure 1:
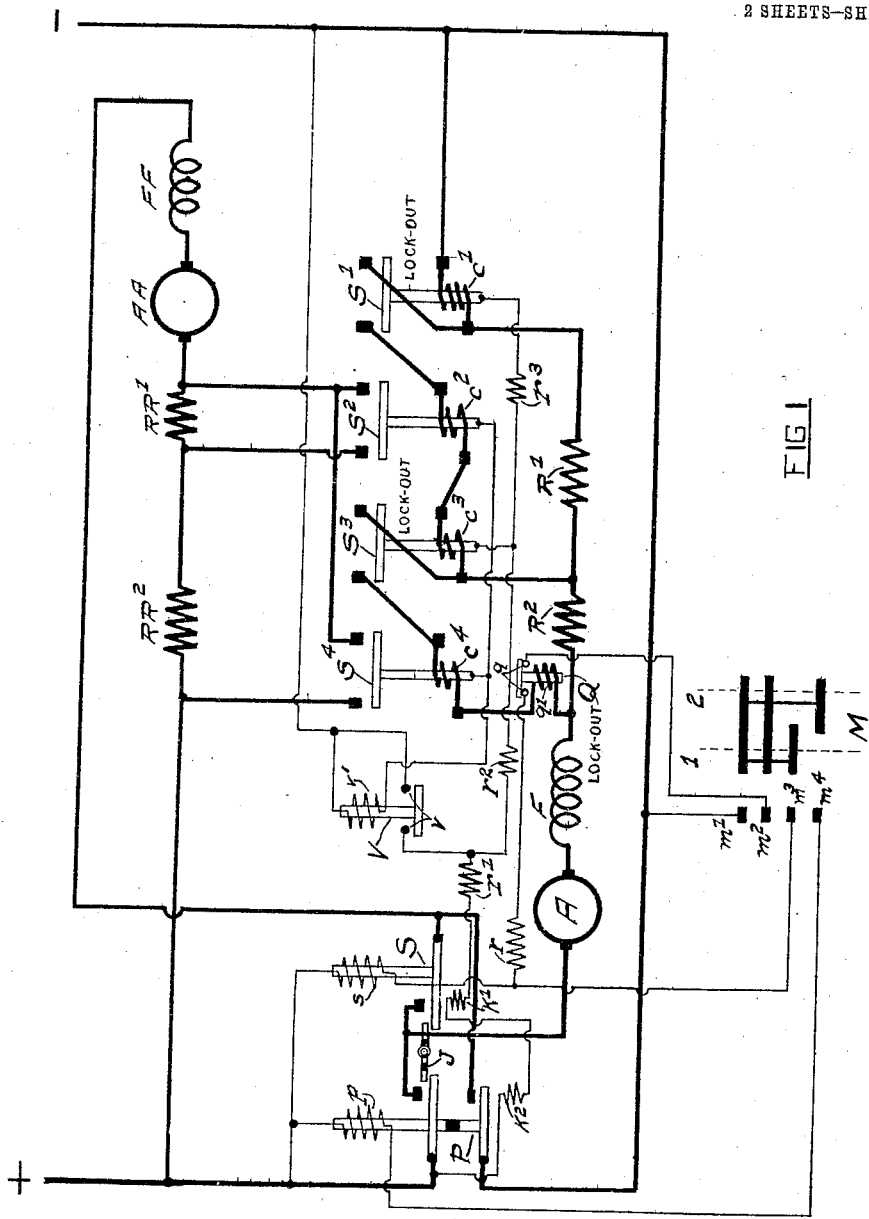

J. H. HALL.
ELECTRIC CONTROLLER.
APPLICATION FILED OCT. 30, 1911.

1,053,498.

Patented Feb. 18, 1913.
2 SHEETS—SHEET 1.

WITNESSES
Elva Staniek
Anna R. Beatty

INVENTOR
Jay H. Hall
BY
F. N. Barber
ATTORNEY

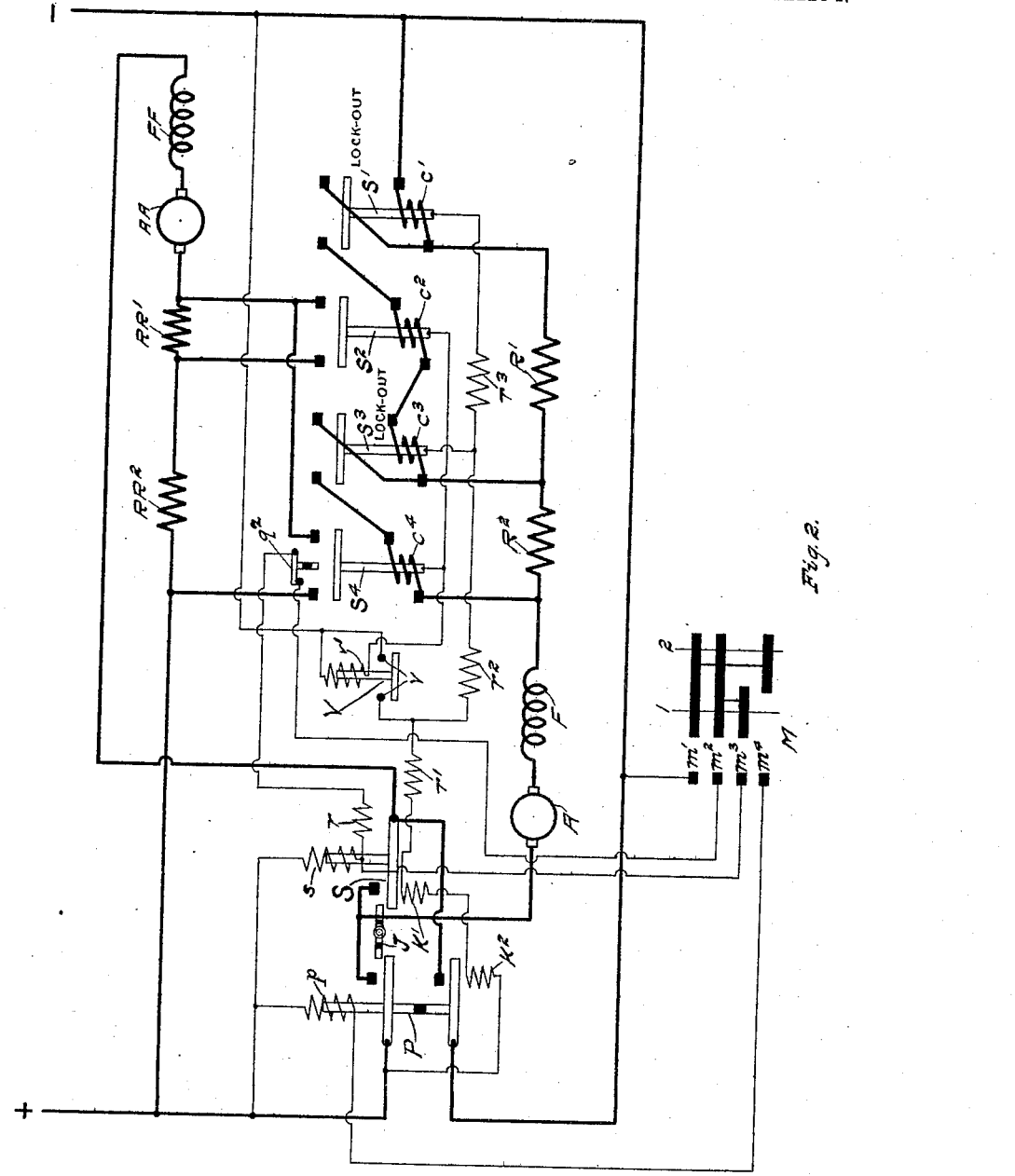

UNITED STATES PATENT OFFICE.

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

ELECTRIC CONTROLLER.

1,053,498.        Specification of Letters Patent.        Patented Feb. 18, 1913.

Application filed October 30, 1911. Serial No. 657,494.

*To all whom it may concern:*

Be it known that I, JAY H. HALL, a citizen of the United States, residing at Cleveland, in the county of Cuyahoga and State of Ohio, have invented new and useful Improvements in Electric Controllers, of which the following is a specification.

My invention relates to improvements in electric controllers, particularly that type which are known as series-parallel controllers.

In the operation of a series-parallel controller in which the changes of connections and the regulation of the amount of resistance in circuit are effected by means of separately-actuated switches under the control of a master-controller, it is desirable that, in case the operator moves the master-controller too rapidly to the parallel position, the series switch be nevertheless held closed until all the resistance-controlling switches have operated to connect the motors in series directly across the line.

It is one object of my invention to provide each motor with a rheostatic resistance controlled by switches having their operating windings in one motor circuit controlled by the strength of the motor current and to provide means whereby, if the master controller is brought to the parallel position without stopping long enough at the series position for the complete operation of the resistance switches, the series switch will be held energized and the parallel switch be prevented from operating until all the said resistance switches have operated. When the last resistance switch has closed the series switch will then open and allow the parallel switch to close after the resistance switches have opened, these then closing in proper order.

Another object of my invention is to provide the series and parallel switches with a locking circuit, energized by the closure of the resistance switches, whereby the operation of one of the said switches is positively prevented as long as any of the resistance switches is closed.

Different ways of accomplishing these objects are shown diagrammatically in Figures 1 and 2.

In Fig. 1, M is a master-controller, S the series switch, and F the parallel switch. The armature of one motor is shown at A, and the field thereof at F, the resistance sections $R^2$, $R'$, forming a rheostat for the said motor. The armature of the other motor is shown at AA and the field thereof at FF. The resistance sections $RR^2$, $RR'$, form a rheostat for the second motor. The resistance controlling switches are indicated at $S'$, $S^2$, $S^3$, $S^4$, the switches $S'$ and $S^3$ controlling the resistance sections of the rheostat for the motor having the armature A, and the switches $S^2$ and $S^4$ the resistance sections of the rheostat for the motor having the armature AA. The switches $S'$ and $S^3$ are of that type described in Harry R. Canfield's applications, Serial Number 583,000, filed September 21, 1910, and Serial Number 604,331, filed January 24, 1911, and Eastwood's Patent No. 1,040,292 granted October 8, 1912, which switches are energized by the current in the motor circuit and locked to the open position until the current in said circuit falls below a certain value. The switches $S^2$, $S^4$ may be of the same type as the switches $S'$ and $S^3$, but are adjusted to close as soon as their windings are energized without locking open. The operating coils $s$ and $p$ of the series switch and parallel switch, respectively, have one end joined to a common wire connected to the positive; the other end of the coil $p$ is connected to the brush $m^4$ on the master controller, whereas the circuit of the coil $s$ is divided in two branches, one of which is connected to the brush $m^3$ on the master-controller, and the other of which is connected to the brush $m^2$ through the contacts $q$ on the relay Q. The brush $m'$ is directly connected to the negative. The switches S and P are provided with a mechanical interlock J and also with a locking circuit which is traced from the positive through the coils $K^2$ and $K'$ in series, and the limiting resistance $r'$, where the circuit divides, one branch being connected to the bridging pieces of the switches $S'$ and $S^3$, and the other being connected directly to the negative through the contacts $v$ of the relay V. A resistance $r^2$ is inserted in the first branch between the resistance $r'$ and the switch $S^3$, and another resistance $r^3$ is inserted in the same branch between the switch $S^3$ and the switch $S'$. The operating coil $v'$ of the relay V has one end connected to the bridging pieces of the switches $S^2$ and $S^4$, and the other end connected to the negative. It will be seen that the contacts of the switches $S'$ and $S^3$ are negative, whereas the contacts of the switches $S^2$ and $S^4$ are positive. Consequently, when the former operate the locking circuit is completed to the negative, but when the latter close it is necessary to provide a path to the negative for the locking circuit. This is obtained precisely by the operation of the relay V, which closes a path to the negative for the locking circuit. The relay Q has its winding $q'$ in the circuit including the winding $c^4$ of the switch $S^4$, and is energized upon closure of the switch $S^3$. This relay is arranged to operate in a manner similar to that of the switches $S'$ and $S^3$; that is, a current in its winding above a certain predetermined value will cause the relay to remain in its unoperated position, keeping its contacts closed, and will cause the relay to operate and open its contacts when the current is reduced. The purpose of the relay is to provide a maintaining circuit for the winding $s$ of the switch S to prevent the opening of the switch S until the proper time if the operator moves his master controller to the position 2 too quickly.

The operation of this controller is as follows: Assuming the master controller to be moved to the series position, i. e., on the line $l$, an operative circuit is completed from the positive through the coil $s$ of the series switch S, and the brush $m^3$ on the master controller to the negative through the brush $m'$. The energization of the coil $s$ causes the switch S to close, whereupon the motor circuit is established from the positive through the resistances $RR^2$ and $RR'$, the armature AA and the field FF of one motor, the switch S, the armature A and the field F of the other motor, the resistances $R^2$, $R'$, and the winding $c'$ of the switch $S'$ to the negative. The two motors are, therefore, connected in series with all the starting resistance in circuit. A circuit through the winding of the switch S, the resistance $r$, the contacts $q$ on the relay Q, and the brushes $m^2$, $m'$, on the master controller is also established. The heavy current flowing at first in the motor circuit locks the switch $S'$ to the open position until the current in the winding $c'$ decreases to the value at which the switch $S'$ is adjusted to operate. The switch $S'$ will then close its contacts. The operation of this switch short-circuits the resistance section $R'$, connects the windings $c^2$ and $c^3$ in the motor circuit in series with the winding $c'$, and completes the locking circuit. Since the switch $S^2$ has not the characteristics of the switch described in the Canfield application, Ser. No. 583,000, it closes its contacts and short-circuits the resistance $RR'$ as soon as its winding $c^2$ is energized, so that the resistance sections $R'$ and $RR'$ are short-circuited practically at the same time. Current flows in the locking circuit from the positive through the coils $K^2$ and $K'$, the resistance $r'$, $r^2$, $r^3$, the bridging piece of the switch $S'$, the contacts thereof, and the winding $c'$ to the negative. The parallel switch P, already prevented from possible operation by the mechanical interlock J, is further locked in the open position by the energization of the coil $K^2$. As soon as the second resistance switch $S^2$ closes its contacts, the circuit of the magnet V is energized, current flowing from the positive through the resistance $RR^2$, the contacts of the switch $S^2$, the bridging piece thereof, and the winding $v'$ to the negative. Consequently, the relay V closes its contacts $v$, thereby providing another path to the negative for the locking circuit through the contacts $v$ of the relay V. The rush of current in the motor circuit resulting from the short-circuiting of the resistance sections $R'$ and $RR'$ locks open the switch $S^3$ until the current diminishes to the value at which the switch $S^3$ is adjusted to operate, whereupon this switch closes its contacts, short-circuits the resistance section $R^2$ and connects the winding $q'$ and the winding $c^4$ in the motor circuit. The contacts of the relay Q are locked closed by the rush of current and open when the motor current diminishes to the value at which the relay is adjusted to operate. Like the switch $S^2$, the switch $S^4$ operates as soon as its winding is energized, and in closing its contacts short-circuits the resistance section $RR^2$. The two motors are now connected in series with all the starting resistance short-circuited, the motor circuit being traced from the positive through the switch $S^4$, the armature AA, the field FF, the series switch S, the armature A, the field F, the windings $q'$ and $c^4$, the contacts of the switch $S^3$, the winding $c^3$, the winding $c^2$, the switch $S'$ and the winding $c'$ to the negative. The resistance switches are all held closed and the contacts of the relay Q are held opened, thereby opening the path through the brush $m^2$ of the series-switch maintaining circuit. If now the master controller is moved to the multiple or parallel position, so that the brushes come on the line 2, the operating coils $s$ and $p$ are energized together for a short time, the circuit of the coil $p$ being closed through brushes $m^4$ and $m'$ on the master controller, but the switch P is prevented from operating by the interlock J and the energization of the coil $K^2$. As soon as the brush $m^3$ leaves its corresponding contact, the coil $s$ is deënergized since the contacts $q$ on the relay Q are open. The series switch S drops to the open position, thereby opening the motor circuit and deënergizing the windings of the relay Q and the resistance-controlling switches $S'$ to $S^4$, inclusive. It will be noticed that the locking circuit is maintained energized as long as any of the resistance switches is closed, this circuit being completed either through the resistances $r^2$, $r^3$, and the switch S' or S³, or through the contacts $v$ on the relay V. The closing of the contacts $q$ of the relay Q does not cause the switch S to close, since the current through the winding is limited by the resistance $r$. When the last resistance switch drops open, the locking circuit is ruptured and the coil $K^2$ is deënergized. This allows the parallel switch P to operate and close its contacts. The closure of the switch P connects the two motors in parallel relation, each in series with all the resistance of its own rheostat.

The motor circuit is as follows: starting from the positive, one branch of the circuit is through the resistances $RR^2$ and RR', the armature AA, the field FF, and the lower contact of the switch P to the negative; and the other branch is through the upper contact of the switch P, the armature A, the field F, the resistances $R^2$ and R', and the winding $c'$ of the switch S' to the negative. The resistance switches S', S², S³, S⁴ will operate as they do when the motors are connected in series, that is, the switch S' closes when the current in its operating winding $c'$ has fallen to the value at which this switch is adjusted to operate. The switch S' then short-circuits the resistance R' in the circuit of the motor with the armature A, connects the windings $c^3$ and $c^2$ in circuit and completes the locking circuit which locks the switch S open owing to the energization of the coil K'. The switch S² closes immediately, short-circuits the resistance RR' in the circuit of the motor having the armature AA, and completes the circuit of the relay V. The following rush of current locks the switch S³ open until the current in the motor circuit diminishes to the value at which the switch S³ is adjusted to operate. The switch S³ will then close its contacts, short circuit the resistance $R^2$ in the circuit of the motor having the armature A, and connect the windings $q'$ and $c^4$ in circuit. The switch S⁴ closes its contacts immediately and short circuits the resistance $RR^2$ in the circuit of the motor having the armature AA, leaving the two motors connected in parallel directly across the line. Current in one branch flows from the positive through the contacts of the switch S⁴, the armature AA, the field FF and the lower contact of the switch P to the negative, and in the other branch from the positive through the upper contact of the switch P, the armature A, the field F, the windings $q'$ and $c^4$, the contacts of the switch S³, the windings $c^3$, $c^2$, the contacts of the switch S' and the windings $c'$ to the negative. The closure of the switch S² energizes the winding of the relay V, which in operating completes another path to the negative through the contacts $v$ for the locking circuit. If the master controller is moved too rapidly to the parallel position, the circuit of the winding of the series switch S is, however, maintained through the contacts of the relay Q, and this circuit will not be opened until after the last resistance switch has operated, and the motor current reduced to a proper value whereupon the relay Q will open its contacts and allow the switch S to open. The switch P will then close. It follows that, though the two coils $s$ and $p$ are energized at the same time, the switch S alone is allowed to operate, and that the switch P is locked at the open position by the interlock J and the magnet $K^2$. Consequently, no matter how rapidly the master controller is manipulated, it is impossible to connect the motors in parallel before the motors have been connected in series and all the resistance switches have operated. The purpose of the resistance $r^2$ is to prevent a short circuit around the windings $c^3$, $c^2$, $c'$, through the contacts $v$; and the purpose of the resistance $r^3$ is to prevent a short circuit around windings $c^3$ and $c^2$ through the bridging pieces of the switches S³ and S'.

Referring now to Fig. 2 it will be seen that it differs from Fig. 1 only in the manner of controlling the circuit between the finger $m^2$ and the resistance $r$. In Fig. 2, I omit the winding $q'$ and substitute the auxiliary switch $q^2$ for the relay Q, the switch $q^2$ being opened mechanically by the switch S⁴ in closing. When the switch S⁴ closes its contacts, it at once opens the switch $q^2$, thereby breaking the path to the negative through the resistance $r$ and the brush $m^2$ of the maintaining circuit of the series switch S. It is believed that the operation of the system shown in Fig. 2 will be readily understood from the operation of the system shown in Fig. 1, already described in detail. It will be noticed also that the operating windings of the resistance controlling switches are connected in one circuit only, since when the two motors are connected in series, the windings are also in series with the two motors, and when the motors are in the parallel relation, the operating windings of the resistance switches are connected in the circuit of one motor only. It follows that the switches S' and S³ always operate at the same value of current.

It will be readily understood by those skilled in the art that reversing switches for the motor, magnetically operated or otherwise, can be used in connection with my invention. They may be provided with locking windings similar to those on switches S or P if desired.

I claim—

1. In an electric controller, two resistances, a switch for one resistance, an operating winding therefor energized by current through the resistance, a switch for the other resistance, an operating winding therefor energized by current through the first resistance, and means for connecting the resistances in series or in parallel.

2. In an electric controller, two resistances, a switch for one resistance, an operating winding therefor energized by current through the resistance and adapted to lock the switch open when the current therein is above a certain value and to operate the switch when the current is reduced, a switch for the other resistance, an operating winding therefor energized by current through the first resistance, and means for connecting the resistances in series or in parallel.

3. In an electric controller, two resistances, a switch having contacts connected to one resistance, a switch having contacts connected to the second resistance, a winding therefor energized by current through the contacts of the first switch, and means for connecting the resistances in series or in parallel.

4. In an electric controller, two resistances, a switch for controlling one resistance, an operating winding therefor energized by current through the resistance and adapted to operate the switch only when the current in the winding is below a predetermined value, a second switch for controlling the other resistance, an operating winding for the second switch energized by the closure of the first switch, and means for connecting the resistances in series or in parallel.

5. In a series-parallel control system, two motors, a resistance for each motor, a series of switches for controlling each resistance, windings for the series of switches controlling one resistance energized by the current flowing in that resistance, each winding adapted to operate its switch only when the current therein is below a predetermined value, windings for the series of switches controlling the other resistance energized upon closure of a corresponding switch in the first series, and means for connecting the motors in series or in parallel.

6. In a motor-control system, two motors, means connecting them in series and in parallel, resistances for the motors, two series of switches for the resistances arranged to close in a predetermined sequence, a winding for each of the first series of switches energized by the motor-current adapted to lock its respective switch open when the current therein is above a predetermined value and to operate the switch when the current therein is reduced, and a winding for each of the second series of switches energized by the closure of a corresponding switch in the first series.

7. In a motor-control system, two motors, switches connecting them in series or in parallel, a locking circuit for preventing the operation of the switches, resistances for the motors, switches for controlling the resistances, windings for the switches energized by at least a portion of the current in the motors, and means for energizing the locking circuit when any of the resistance-controlling switches is closed.

8. In a series-parallel controller, a master controller, two resistances, a series of switches for controlling one resistance, a series of switches for controlling the other resistance, a switch for connecting the two resistances in series, an actuating winding therefor having two branches, the first of which is closed at a certain position of the master controller, and the second of which is closed at all operative positions of the master controller, a contact in the second branch, means for closing the contact when current flows in one resistance, and means for opening the contact after the last switch controlling the said resistance has operated.

9. In a motor-control system, two motors, resistances for the motors, switches for controlling the resistance, a master controller, a switch for connecting the motors in parallel, an actuating winding therefor closed at a certain position of the master controller, a switch for connecting the motors in series, an actuating winding therefor having two branches, one of which is closed at a certain position of the master controller and the other of which is closed at all operative positions of the master controller, a contact in the second branch, and means energized by the current in one motor for locking the contact closed and for opening the contact after the last resistance-controlling switch for the said motor has operated.

10. In a motor-control system, two motors, two resistances therefor, a series of switches for controlling one resistance, a series of switches for controlling the other resistance, switches for connecting the motors in series and in parallel, a locking circuit for preventing the operation of the switches having two branches, means for energizing the locking circuit through the first branch when any of the switches controlling the first resistance is closed, and means for energizing the locking circuit when any of the switches controlling the second resistance is closed.

11. In a series-parallel control system, two motors, resistances therefor, switches for controlling the resistances, series and parallel switches for connecting the motor in series and in parallel, a master switch for controlling the switches, and means operated by the current in the motor circuit, when the master switch is closed, for preventing the opening of the series switch until all the resistances have been cut out.

12. In a series-parallel control system, two motors, a circuit therefor, a series switch and a parallel switch, a master switch for controlling the switches, a series of switches for controlling the circuit, operating windings therefor adapted to be connected in the motor circuit, and means, when the master switch is moved quickly to the parallel position, for preventing the connection of the motors in parallel until the current in the motor circuit is reduced to a certain value after all of the circuit-controlling switches have closed while the motors are in series.

13. In a series-parallel controller, two resistances, controlling switches for the resistances, magnetically-operated switches for connecting the resistances in series and in parallel, means for closing the series switch, means for energizing the winding of the parallel switch while the series switch is closed, means preventing the closure of the parallel switch while the series switch is closed, and means for preventing the opening of the series switch until all of the resistance controlling switches have closed.

14. In a series-parallel control system, two motors, resistances therefor, controlling switches for the resistances, operating windings therefor energized by the current through one of the motors, magnetically-operated switches for connecting the motors in series and in parallel, and means for preventing the connection of the motors in parallel until after the motors have been connected in series and all the resistances have been cut out.

15. In a series-parallel control system, two motors, resistances therefor, controlling switches for the resistances, operating windings therefor energized by the current through one of the motors, magnetically-operated switches for connecting the motors in series and in parallel, and means for preventing the connection of the motors in parallel until after the motors have been connected in series and the current in the motor circuit has diminished to a certain value after all the resistances have been cut out.

16. In a series-parallel control system, two motors, means for connecting them in series and in parallel, and means for preventing the change from series to parallel, said means including a relay and an operating winding energized by current through one of the motors.

17. In a series-parallel control system, two motors, means for connecting them in series or in parallel, resistances for the motors, controlling switches for the resistances, and means for preventing the change from series to parallel, said means including a relay and an operating winding connected into the circuit of one of the motors by the closure of one of the resistance-controlling switches.

Signed at Cleveland, Ohio, this 27th day of October, 1911.

JAY H. HALL.

Witnesses:
R. H. BENNETT,
H. M. DIEMER.

---

Copies of this patent may be obtained for five cents each, by addressing the "Commissioner of Patents, Washington, D. C."